US009037446B2

(12) United States Patent
Xie et al.

(10) Patent No.: US 9,037,446 B2
(45) Date of Patent: May 19, 2015

(54) ELECTRICAL-THERMAL CO-SIMULATION WITH JOULE HEATING AND CONVECTION EFFECTS FOR 3D SYSTEMS (75) Inventors: Jianyong Xie, Atlanta, GA (US); Madhavan Swaminathan, Marietta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 591 days.

(21) Appl. No.: 13/224,270

(22) Filed: Sep. 1, 2011

(65) Prior Publication Data

US 2012/0053913 A1 Mar. 1, 2012

Related U.S. Application Data (60) Provisional application No. 61/379,156, filed on Sep. 1, 2010.

(51) Int. Cl.
*G06F 17/50* (2006.01)

(52) U.S. Cl.
CPC ........ *G06F 17/5036* (2013.01); *G06F 17/5068* (2013.01); *G06F 17/5045* (2013.01); *G06F 17/5018* (2013.01); *G06F 2217/80* (2013.01)

(58) Field of Classification Search
CPC ............ G06F 17/5018; G06F 17/5036; G06F 17/5045; G06F 17/5068; G06F 2217/80; G06F 17/50
USPC .................... 703/2, 14, 13; 716/105, 123, 131
See application file for complete search history.

(56) References Cited

U.S. PATENT DOCUMENTS 6,188,582 B1   2/2001 Peter
RE41,001 E    11/2009 Oshima
2008/0091389 A1  4/2008 Kim

OTHER PUBLICATIONS

Xie, Jianyong et al., "Electrical-Thermal Co-Analysis for Power Delivery Networks in 3D System Integration", Sep. 28-30, 2009, IEEE International Conference on 3D System Integration, IEEE.*
Xie, Jianyong et al., "Effect of System Components on Electrical and Thermal Characteristics for Power Delivery Networks in 3D System Integration", Oct. 19-21, 2009, IEEE 18th Conference on Electrical Performance of Electronic Packaging and Systems, IEEE.*
Tsai, Ching-Han et al., "Cell-Level Placement for Improving Substrate Thermal Distribution", Feb. 2000, IEEE Transactions on Computer-Aided Design of Integrated Circuits and Systems, vol. 19, No. 2, IEEE.*

(Continued)

*Primary Examiner* — Kamini S Shah
*Assistant Examiner* — Cedric D Johnson
(74) *Attorney, Agent, or Firm* — Bryan W. Bockhop; Bockhop & Associates, LLC (57) ABSTRACT In a method for simulating temperature and electrical characteristics within an circuit, a temperature of at least one volume within the circuit as a function of a resistance within the at least one volume is repeatedly calculated and the resistance as a function of the temperature is repeatedly calculated until the temperature is within a predetermined tolerance of a previous temperature result and until the resistance is within a predetermined tolerance of a previous resistance result. Once the temperature is within a predetermined tolerance of the previous temperature result and the resistance is within a predetermined tolerance of the previous resistance, then an output indicative of the temperature is generated.

17 Claims, 5 Drawing Sheets (56) References Cited

OTHER PUBLICATIONS

Koo, Jae-Mo et al., "Integrated Microchannel Cooling for Three-Dimensional Electronic Circuit Architectures", Jan. 2005, Journal of Heat Transfer, vol. 127, ASME.*

Lee et al.; "Analysis of power delivery network constructed by irregular-shaped power/ground plane including densely populated via-hole"; Publication Year: 2005; Advanced Packaging, IEEE Transactions on; vol. 28, Issue: 2; pp. 168-173.

Wu et al.; "Composite effects of reflections and ground bounce for signal line through a split power plane"; Publication Year: 2002; Advanced Packaging, IEEE Transactions on; vol. 25, Issue: 2; pp. 297-301.

Bharath et al.; "Efficient Simulation of Power/Ground Planes for SiP Applications"; Publication Year: 2007; Electronic Components and Technology Conference, 2007. ECTC '07. Proceedings. 57th; pp. 1199-1205.

Engin et al.; "Finite-difference modeling of noise coupling between power/ground planes in multilayered packages and boards"; Publication Year: 2006; Electronic Components and Technology Conference, 2006. Proceedings. 56th.

Pan et al.; "A combined finite difference and analytic expression approach to crossover capacitance in a multilayer dielectric environment"; Publication Year: 1996; Components, Packaging, and Manufacturing Technology, Part B: Advanced Packaging, IEEE Transactions on; vol. 19, Issue: 3; , pp. 615-620.

Bharath et al; "Computationally Efficient Power Integrity Simulation for System-on-Package Applications"; Publication Year: 2007; Design Automation Conference, 2007. DAC '07. 44th ACM/IEEE; , pp. 612-617.

Bushyager et al.; "Q-factor prediction and optimization of multilayer inductors for RF packaging microsystems using time domain techniques"; Publication Year: 2002; Electronic Components and Technology Conference, 2002. Proceedings. 52nd; pp. 1718-1721.

Horii et al.; "Super-compact multilayered left-handed transmission line and diplexer application"; Publication Year: 2005; Microwave Theory and Techniques, IEEE Transactions on; vol. 53, Issue: 4, Part: 2; pp. 1527-1534.

U.S. Appl. No. 11/888,705, filed Aug. 2, 2007 by Engin et al.—related case owned by common assignee.

U.S. Appl. No. 12/710,991, filed Feb. 23, 2010 by Bahrath et al.—related case owned by common assignee.

* cited by examiner

ELECTRICAL-THERMAL CO-SIMULATION WITH JOULE HEATING AND CONVECTION EFFECTS FOR 3D SYSTEMS

CROSS-REFERENCE TO RELATED APPLICATION(S)

This application claims the benefit of U.S. Provisional Patent Application Ser. No. 61/379,156, filed Sep. 1, 2010, the entirety of which is hereby incorporated herein by reference.

BACKGROUND OF THE INVENTION

1. Field of the Invention

The present invention relates to systems for simulating parameters of electronic circuits and, more specifically, to a system that simulates temperature and resistance in a circuit.

2. Description of the Related Art

With integrated circuit (IC) fabrication technology scaling below 90 nm nodes, power supply voltages of IC chips have been reduced to 1.2 V and below in order to reduce power consumption and increase functionality. Due to the low noise margin and threshold level voltage of such circuits, DC voltage drop analysis in package level and board level is becoming increasingly important. However, due to the continuing growth of IC integration density, the power density of a single chip can increase beyond 100 W/cm$^2$. In addition, with three dimensional (3D) system integration enabled by through-silicon via (TSV) technology, the power density in 3D integrated systems is expected to become much larger. As a result, thermal analysis of IC's is becoming critical in the design process.

Due to the temperature-dependent electrical resistivity, temperature is becoming an important factor in the direct current (DC) IR (i.e., voltage) drop simulations. In the past, DC IR drop analysis has been based on equivalent circuit approaches. However, temperature-dependent resistivity has not been considered in such approaches. In order to capture the temperature effects on DC IR drop in 3D integrated systems, an electrical-thermal co-simulation method has been attempted and the effects of system components on electrical and thermal characteristics of power delivery networks (PDN) in 3D system integration have been studied. However, such approaches have not taken into account temperature distribution across the geometry of the integrated circuit, nor have they considered the effects of convection and fluidic cooling. As a result, circuit designers have not been able to examine temperature effects on an integrated circuit in relation to specific adjustments to a circuit design.

Therefore, there is a need for a circuit simulation system that relates temperature variation to IR drop across a circuit.

SUMMARY OF THE INVENTION

The disadvantages of the prior art are overcome by the present invention which, in one aspect, is a method, operable on a digital computer coupled to a user interface, for simulating electrical characteristics and temperature characteristics in an electronic circuit. A routine for generating a three-dimensional mesh is executed on the digital computer so that the mesh includes a plurality of cells and a plurality of nodes. Each cell represents a heat conducting volume within the circuit and each node represents an electrically conducting point within the circuit. Each of several variables are initialized. These variables include: a previous iteration temperature variable associated with each cell; a current iteration temperature variable associated with each cell; a previous iteration resistance variable associated with each node; and a current iteration resistance variable associated with each node. Until the previous iteration temperature variable associated with each cell is within a first predetermined tolerance of the current iteration temperature variable associated with each cell and the previous iteration resistance variable associated with each node is with a second predetermined tolerance of the current iteration resistance variable associated with each node, the following steps are performed: (i) calculating for each cell an average temperature of the cell based on: heat generated in the cell as a result of a pre-calculated current, from the DC voltage drop, flowing through a previous resistance having a value corresponding to the previous iteration resistance variable associated with a node within the cell and heat transferred out of the cell and storing the average temperature in the current iteration resistance variable associated with the cell; (ii) calculating for each node a current resistance associated with the node based on the previous iteration temperature variable for a cell in which the node resides and storing the current resistance in the current iteration resistance variable associated with the node; (iii) comparing the previous iteration temperature variable associated with each cell to the current iteration temperature variable associated with each cell and calculating the previous iteration resistance variable associated with each node to the current iteration resistance variable associated with each node; and (iv) after the comparing step, storing the average temperature in the previous iteration temperature variable and storing the current iteration resistance in the previous iteration resistance variable. Once the previous iteration temperature variable associated with each cell is within the first predetermined tolerance of the current iteration temperature variable associated with each cell and when the previous iteration resistance variable associated with each node is with the second predetermined tolerance of the current iteration resistance variable associated with each node, then an output that indicates an average temperature associated each cell is generated.

In another aspect, the invention is a method, operable on a digital computer coupled to a user interface, for simulating temperature and electrical characteristics within an circuit. A temperature of at least one volume within the circuit as a function of a resistance within the at least one volume is repeatedly calculated and the resistance as a function of the temperature is repeatedly calculated until the temperature is within a predetermined tolerance of a previous temperature result and until the resistance is within a predetermined tolerance of a previous resistance result. Once the temperature is within a predetermined tolerance of the previous temperature result and the resistance is within a predetermined tolerance of the previous resistance, then an output indicative of the temperature is generated.

In yet another aspect, the invention is a circuit simulation device. A mesh generator is configured to generate a three-dimensional mesh that includes a plurality of cells and a plurality of nodes. Each cell represents a heat conducting volume within a circuit and each node represents an electrically conducting point within the circuit. An initializer is configured to initialize each of: a previous iteration temperature variable associated with each cell; a current iteration temperature variable associated with each cell; a previous iteration resistance variable associated with each node; and a current iteration resistance variable associated with each node. A simulator is configured to repeatedly until a current iteration average temperature for each cell is within a first predetermined tolerance of a previous iteration average temperature and until a current iteration resistance for each node is within a second predetermined tolerance of a previous iteration average temperature for each cell: (i) determine the current iteration average temperature for each cell and the current iteration resistance associated with each node; (ii) compare the current iteration average temperature for each cell to the previous iteration average temperature for each cell and compare the current iteration resistance associated with each node to the previous iteration resistance associated with each node; and (iii) save the current iteration average temperature for each cell as the previous iteration average temperature for each cell and save the current iteration resistance associated with each node as the previous iteration resistance associated with each node. An interface is configured to output an indication of the current iteration average temperature of each cell.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

A preferred embodiment of the invention is now described in detail. Referring to the drawings, like numbers indicate like parts throughout the views. Unless otherwise specifically indicated in the disclosure that follows, the drawings are not necessarily drawn to scale. As used in the description herein and throughout the claims, the following terms take the meanings explicitly associated herein, unless the context clearly dictates otherwise: the meaning of "a," "an," and "the" includes plural reference, the meaning of "in" includes "in" and "on." In the context of microfluidic fluid flow, a fluid flowing "near a cell" or "near a volume" also includes a fluid flowing through the cell or through the volume (such as through a microfluidic channel passing through the cell or volume).

Figure 1:
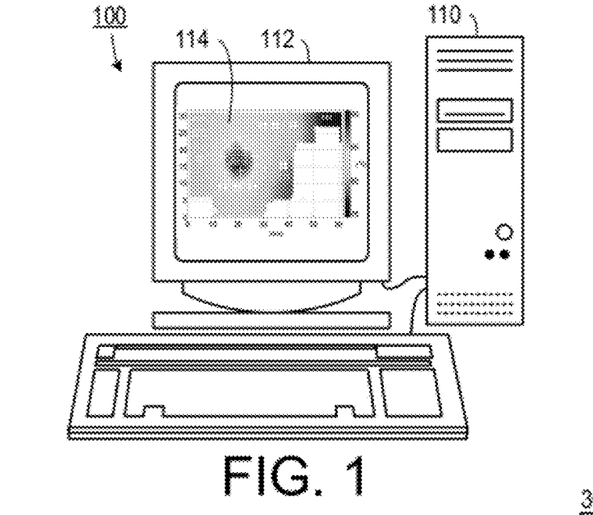
FIG. 1 is a schematic representation of one embodiment of a circuit simulating system.
Figure 2:
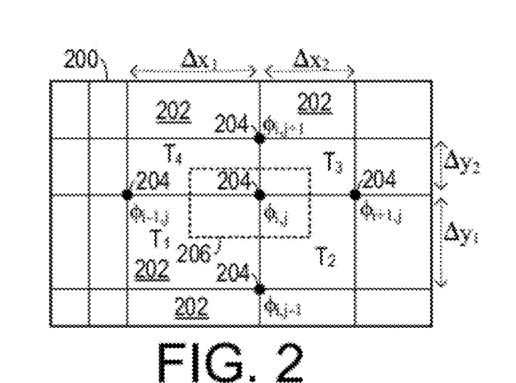
FIG. 2 is a schematic representation of a 2D rectangular grid.

As shown in FIG. 1, one embodiment of a circuit simulating device 100 includes a digital computer 110 with a computer-readable memory that is coupled to a video monitor display interface 112, upon which a graphic circuit simulation result 114 may be displayed. The computer 110 is programmed to run a meshing routine and a circuit simulation routine. As shown in FIG. 2, the meshing routine generates a circuit model that includes a mesh 200 representing the circuit. In the model, the mesh includes a plurality of volumes 202 (also referred to herein as "cells") and a plurality of nodes 204, each associated with a different volume 202. (It should be noted that FIG. 2 shows a two-dimensional mesh for simplicity, whereas a three-dimensional mesh would be used in a practical embodiment.) Each volume 202 has an associated temperature due to heat generated by electrical components within the volume 202 and heat transferred into and out of the volume 202. Each node 204 has an associated temperature-dependent resistance that represents the resistance of electrical components within the circuit that are associated with the node 204. One of many types of mesh can be used, including a rectangular prismatic mesh, a tetrahedral mesh, or any other type of mesh supported by common meshing algorithms. Also, either a regular mesh or an irregular mesh may be employed.

Figure 3A:
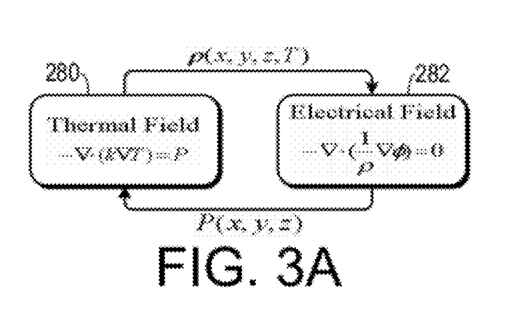
FIG. 3A is a diagram showing the relationship between electrical and thermal fields.

Due to the temperature-dependent electrical resistivity $\rho(x, y, z, T)$ and Joule heating generated in the conductors, the electrical and thermal characteristics couple to each other and form a non-linear system of equations, as shown in FIG. 3A. These equations describe a thermal field 280 and an electrical field 282, each of which is dependant upon the other.

Figure 3B:
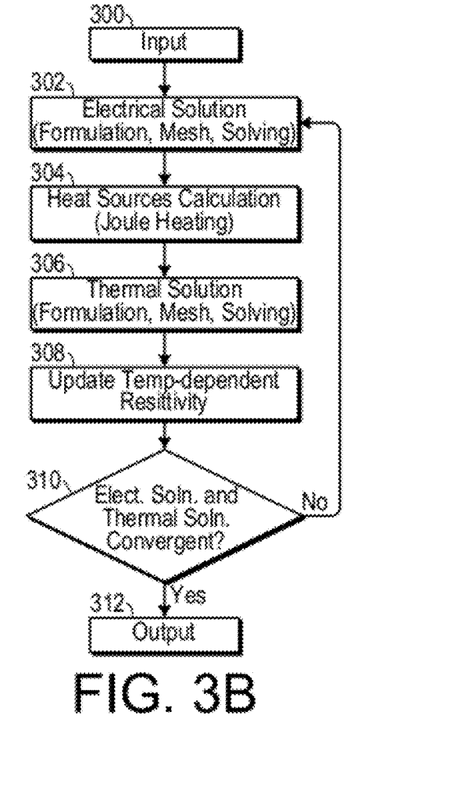
FIG. 3B is a flow chart showing one method employed in a circuit simulating system.

The simulator routine calculates the temperature of each cell based on a pre-calculated current flowing through the cell (based on the DC voltage drop) and the resistance of the node within the cell then it calculates a new value of resistance for each cell based on the temperature of the cell. These calculations are repeated until the current values of temperature and resistance converge to within a predetermined range of the previous values of temperature and resistance. As shown in FIG. 3A, in one embodiment, to obtain accurate voltage distribution with convection and Joule heating effects, the simulator solves the nonlinear electrical-thermal equations (1-4), simultaneously as part of an iterative electrical-thermal co-simulation method. The iterative simulation technique includes the following steps:

1. Input: Setting input information on system layout parameters, initial material properties, excitations, and boundary conditions for steady state electrical and thermal analysis 300.
2. Voltage drop simulation: Steady state electrical voltage distribution simulation for voltage, current, and power distribution profiles in the PDN 302.
3. Heat calculation based on electrical resistances and currents: Heat sources (Joule heat) calculation from the power distribution profile 304.
4. Thermal simulation calculating temperature distribution: Using the updated Joule heat excitation for steady state thermal simulation with thermal conduction, air convection and fluidic cooling 306.
5. Update resistances: Based on the temperature distribution profile obtained, the electrical resistivity of conductors in the PDN is updated and thereby thermal effect on voltage drop is included 308.
6. Determining if the temperature and voltage distributions have converged. 310 The final thermal and voltage distributions are displayed 312 if convergence is reached. Otherwise, the iterations are continued.

One embodiment is directed to determining thermal effects in a power delivery network (PDN) circuit. Such a PDN could include the power and ground planes of a circuit board, the power and ground layers of an integrated circuit mounted on the circuit board, connecting pins and any through-silicon vias in the integrated circuit. (It should be understood that in other embodiments, the system could simulate isolated elements in a PDN, or combinations thereof.)

In steady state, the governing equation for voltage distribution in PDN can be expressed as:

$$\nabla \cdot \left( \frac{1}{\rho(x, y, z, T)} \nabla \phi(x, y, z) \right) = 0 \quad (1)$$

where $\phi(x,y,z)$ represents the voltage distribution and $\rho(x,y,z,T)$ is the temperature-dependent electrical resistivity of conductors.

For steady-state thermal analysis, the governing heat equations for solid medium and fluid flow can be expressed as:

$$\nabla \cdot [k(x,y,z) \nabla T(x,y,z)] = -P(x,y,z) \quad (2a)$$

$$\sigma c_p \vec{v}(x,y,z) \cdot \nabla T(x,y,z) = \nabla \cdot (k_f \nabla T(x,y,z)) \quad (2b)$$

where, $k(x,y,z)$ and $T(x,y,z)$ represent the thermal conductivity of solid medium and temperature distribution, respectively; $\sigma$, $c_p$ and $\vec{v}(x,y,z)$ represent the density, heat capacity and velocity distribution of the fluid, respectively; $k_f$ is the thermal conductivity of the fluid.

In equation (2a), $P(x,y,z)$ is the total heat source excitation including the heat source from chip and Joule heating converted from the Ohmic loss due to current flowing through conductors in the PDN. The Joule heating can be expressed as:

$$P_{Joule}(x,y,z) = \vec{J} \cdot \vec{E}(x,y,z) \quad (3)$$

where, $\vec{J}$ is the current density and $\vec{E}(x,y,z)$ is the electrical field distribution in the PDN.

Since the electrical resistivity is temperature-dependent, it is described by:

$$\rho = \rho_0 [1 + \alpha(T - T_0)] \quad (4)$$

where, $\rho_0$ is the electrical resistivity at $T_0$ which is 20° C., and $\alpha$ is the temperature coefficient of the electrical resistance.

By solving equation (1) in the presence of the boundary conditions given below in (5), the voltage distribution of the PDN can be computed.

$$\phi |_{\Gamma_1} = V_{input} \quad (5)$$

$$\frac{\partial \phi}{\partial n} \bigg|_{\Gamma_2} = I_{output}$$

$$\frac{\partial \phi}{\partial n} \bigg|_{\Gamma_3} = 0$$

where $\Gamma_1$, $\Gamma_2$ represent the voltage supply boundary and current source boundary; $\Gamma_3$ represents all the other homogenous Neumann boundaries in the PDN. $V_{input}$ and $I_{output}$ represent voltage excitation and output current density, respectively.

Since three dimensional power delivery networks usually have large size planes and small size structures such as through-silicon vias (TSVs), C4s, apertures etc, a 3D non-uniform mesh is used to reduce the number of unknowns, reduce the simulation time and also to capture all geometries accurately. In this embodiment, a 3D non-uniform rectangular grid is used. Though 3D non-uniform rectangular grid is used, the finite volume formulation is explained on the 2D non-uniform grid shown in FIG. 2 for simplicity.

The formulation for solving the voltage distribution equation (1) is performed during each iteration using location-dependent resistivity. In FIG. 2, $\phi_{i,j}$ represents the voltage at grid point (i,j), which is surrounded by four nodes. $\Delta x_1$, $\Delta x_2$, $\Delta y_1$, and $\Delta y_2$, are the nodal distances between node (i,j) and its adjacent nodes in x and y directions, respectively. It is assumed that the four surrounding cells of node (i,j) have different resistivities $\rho_1$, $\rho_2$, $\rho_3$ and $\rho_4$, and have different temperatures $T_1$ $T_2$ $T_3$ $_{and}$ $T_4$ which can be obtained from the thermal simulation.

In order to apply the finite volume method, node (i,j) is surrounded by a finite volume cell 206. The intersection points between the dashed cell 206 and other four cells are the center points of each cell. By integrating equation (1) over the dashed cell and applying the divergence theorem, we obtain:

$$\int_{\substack{dashed \\ line}} \frac{1}{\rho(x, y, z, T)} \nabla \phi(x, y, z) \cdot \hat{n} \, dl = 0 \quad (6)$$

where $\hat{n}$ is the outward pointing unit normal vector at the boundary of the dashed cell 206. Initially, the electrical resistivity is assumed uniform and thus the electrical resistivity $\rho(x,y,z,T)$ is a constant. By applying the finite difference approximation to the first order derivative of $\phi$ in equation (6), the finite volume scheme at node (i,j) can be obtained as:

$$\frac{\phi_{i,j} - \phi_{i-1,j}}{\frac{\rho \Delta x_1}{d}} + \frac{\phi_{i,j} - \phi_{i+1,j}}{\frac{\rho \Delta x_2}{d}} + \frac{\phi_{i,j} - \phi_{i,j-1}}{\frac{\rho \Delta y_1}{w}} + \frac{\phi_{i,j} - \phi_{i,j+1}}{\frac{\rho \Delta y_2}{w}} = 0 \quad (7)$$

where $w=(\Delta c_1 + \Delta x_2)/2$ and $d=(\Delta y_1 + \Delta y_2)/2$. Note that the finite volume (7) is analogous to the Kirchhoff's Current Law (KCL).

In order to include the temperature effect on voltage distribution, the temperature distribution $T_1$ $T_2$ $T_3$ $_{and}$ $T_4$ in the surrounding cells are considered. Finally, the finite volume scheme with temperature-dependent resistivity can be generalized as:

$$\left( \frac{\Delta y_1}{\rho(T_1) \Delta x_1} + \frac{\Delta y_2}{\rho(T_4) \Delta x_1} \right) (\phi_{i,j} - \phi_{i-1,j}) + \quad (8)$$

$$\left( \frac{\Delta y_1}{\rho(T_2) \Delta x_2} + \frac{\Delta y_2}{\rho(T_3) \Delta x_2} \right) (\phi_{i,j} - \phi_{i+1,j}) +$$

$$\left( \frac{\Delta x_1}{\rho(T_1) \Delta y_1} + \frac{\Delta x_2}{\rho(T_2) \Delta y_1} \right) (\phi_{i,j} - \phi_{i,j-1}) +$$

$$\left( \frac{\Delta x_1}{\rho(T_4) \Delta y_2} + \frac{\Delta x_2}{\rho(T_3) \Delta y_2} \right) (\phi_{i,j} - \phi_{i,j+1}) = 0$$

Based on the above finite volume formulation, the DC IR drop problem can be converted to a system of equations $$Yx = b \quad (9)$$

where Y, is the impedance matrix, which is sparse and symmetric positive definite (SPD).

For 3D DC IR drop problem discretized with N cells in x, y and z direction, respectively, the impedance matrix Y has bandwidth of $2N^2$. As a result, for a 10 million problem with N=215, the bandwidth of Y is approximately 92.4 K. Because of the very large bandwidth and limited memory, it becomes very difficult to solve problems with millions of unknowns using a direct method such as LU or Cholesky factorization.

Due to the SPD property of impedance matrix Y, the Krylov subspace based conjugate gradient (CG) method can be used to solve equation (9). In addition, to reduce the condition number and hence improve the convergence rate of the CG iteration, a pre-conditioning matrix M needs to be used. Instead of solving equation (9), the following equation is solved.

$$MYx = Mb \qquad (10)$$

A commonly used pre-conditioner is incomplete LU factorization of the Y matrix. However, for large scale DC IR problems with more than one million unknowns, to form an incomplete LU preconditioner, a large amount of memory is required. With limited memory, it can even cause breakdown of simulation. To overcome this issue, the diagonal matrix is used as the pre-conditioner. One example of a pre-conditioned conjugate gradient algorithm can include the following:

1. $r = b - Yx_0$, $\rho_0 = \|r\|_2^2$, $k=1$, $x=x_0$

2. Do While $\sqrt{\rho_{k-1}} > \epsilon \|b\|_2$ and $k < k_{max}$

(a) $z = Mr$

(b) $\tau_{k-1} = z^T r$ if $k=1$ then $\beta=0$ and $p=z$ else

(c) $\beta = \tau_{k-1}/\tau_{k-2}$, $p = z + \beta p$

(d) $w = Yp$

(e) $\alpha = \tau_{k-1}/p^T w$

(f) $x = x + \alpha p$

(g) $r = r - \alpha w$

(h) $\rho_k = r^T r$

(i) $k = k+1$

In this algorithm $x_0$ is the initial iterate and r is the initial residual in Step 1; $\epsilon$ is the stop criteria in the CG method. Comparing to the CG method, the PCG method has additional computational cost of one matrix-vector multiplication in Step 2a and one vector-vector multiplication in Step 2b. Since M is a diagonal preconditioner, the additional computing cost in PCG method is nearly minimum. In addition, due to the symmetric property of Y matrix, it only needs to store the upper triangular portion of Y matrix as well as the per-conditioner M and corresponding vectors in CG iteration. As a result, the CG method with a diagonal pre-conditioner M can solving large scale DC IR drop problem by using limited memory efficiently.

Moreover, a good starting iteration of $x_0$ can make CG method converge faster than using default setting of $x_0=0$. For DC IR problems with mesh refinement, the initial start iteration of $x_0$ can be obtained by interpolating from the solution of previous mesh. In order to save simulation time for problems with mesh refinement, the original problem with previous mesh is first simulated, and solution $x_{old}$ is generated. Secondly, the solution $x_{old}$ from previous mesh is interpolated to obtain the initial iteration $x_0$ for problem with mesh refinement. Finally, the DC IR problem with mesh refinement is simulated with interpolated initial iteration $x_0$.

While use of the PCG solver for DC voltage drop described above, it is important to realize that the system is not limited to PCG solver, but can use any available solver to solve the system equation Yx=b.

Figure 4:
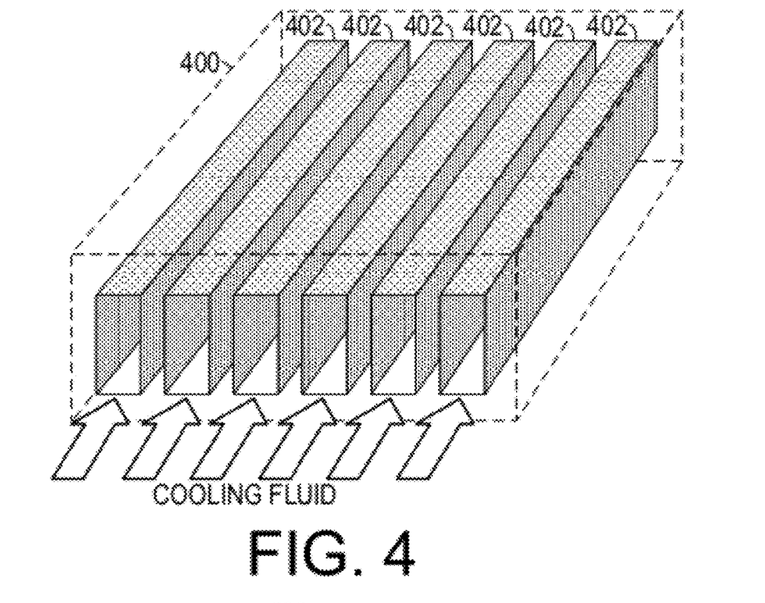
FIG. 4 is a perspective view of a plurality of micro-fluidic cooling channels.
Figure 5A:
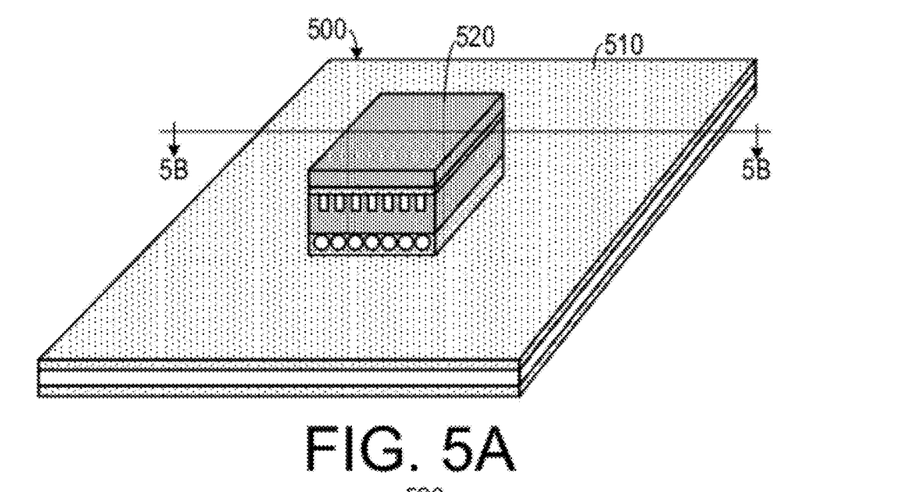
FIG. 5A is a top perspective view of a mounted circuit.
Figure 5B:
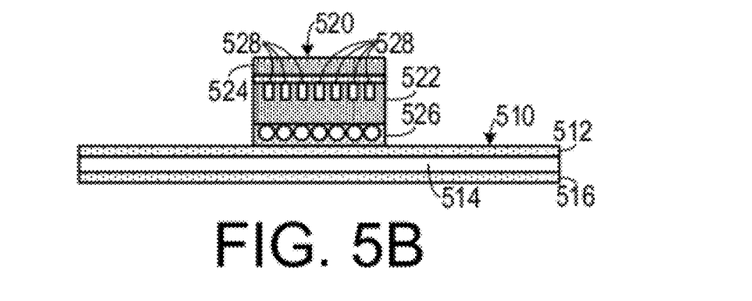
FIG. 5B is a cross-sectional view of the circuit shown in FIG. 5A, taken along line 5B-5B.
Figure 6:
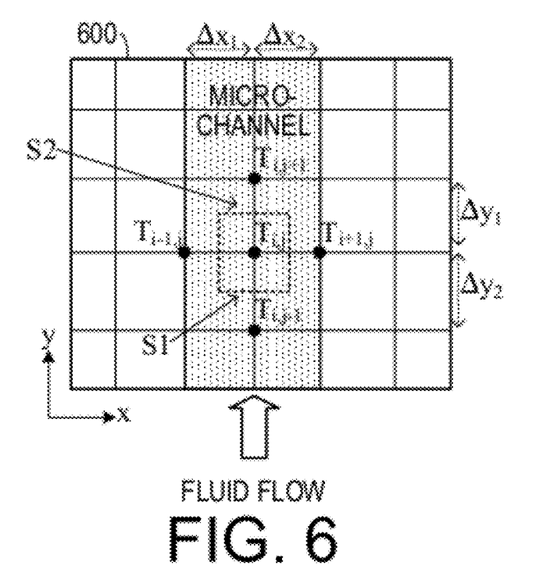
FIG. 6 is a schematic representation of a portion of a circuit model grid that includes a fluid flowing about a portion thereof.

As shown in FIG. 4, one embodiment also models the effect of a cooling fluid (such as deionized water or air) passing through microfluidic channels 402 passing through a portion of the circuit 400. As shown in FIGS. 5A and 5B, a modeled circuit 500 can include an integrated circuit package 520 mounted on a circuit board 510. The circuit board 510 can, for example, include a signal plane 512, a power plane 516 and a resin plane 514. The integrated circuit package 520 can include a filler layer 526, an integrated circuit chip 522, through which a plurality of micro-fluidic channels 528 pass and a cover portion 524. All of these components in the circuit 500 can be part of the meshed model. A conceptional model 600 of such a fluid cooled circuit, including a mesh, is shown in FIG. 6.

For the heat equation (2a) with only conduction, since it has the same form as equation (1), the same finite volume formulation can be applied resulting in:

$$\frac{T_{i,j} - T_{i-1,j}}{\frac{\Delta x_1}{kd}} + \frac{T_{i,j} - T_{i+1,j}}{\frac{\Delta x_2}{kd}} + \frac{T_{i,j} - T_{i,j-1}}{\frac{\Delta y_1}{kw}} + \frac{T_{i,j} - T_{i,j+1}}{\frac{\Delta y_2}{kw}} = P_{total} \qquad (11)$$

where $$P_{total} \iint_{\substack{dashed \\ cell}} -P(x,y,z) dS$$

is the total heat source in the dashed cell.

In order to obtain accurate temperature distribution in the thermal simulation of realistic systems, the convection boundary condition $$k \frac{\partial T}{\partial n}\bigg|_{convection} = -h_c(T - T_a) \qquad (12)$$

is considered. In equation (12), $T_a$ and $h_c$ represent the ambient temperature and convection coefficient, respectively. The same finite volume formulation procedure can also be applied at the convection boundary with non-uniform mesh 900, as shown in FIG. 9.

Figure 9:
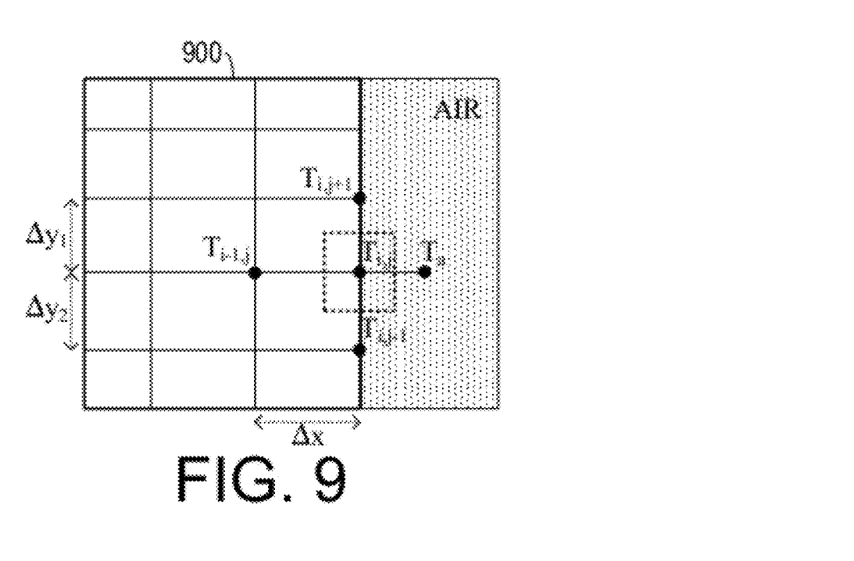
FIG. 9 is a schematic representation of a portion of a circuit model grid that includes a fluid flowing adjacent to a portion thereof.

In FIG. 9, node (i,j) at the convection boundary is surrounded by a finite volume cell (dashed line). By integrating equation (2a) over the dashed cell and applying the divergence theorem, we obtain:

$$\int_{\substack{dashed \\ line}} k(x,y,z) \nabla T(x,y,z) \cdot \hat{n} dl = \iint_{\substack{dashed \\ cell}} -P(x,y,z) dS \qquad (13)$$

By applying the finite difference approximation to the first order derivative of T(x,y,z) in equation (13) and incorporating equation (12), the finite volume scheme for heat equation with convection boundary condition at node (i,j) can be expressed as:

$$\frac{T_{i,j}-T_a}{\frac{1}{h_c d}}+\frac{T_{i,j}-T_{i-1,j}}{\frac{\Delta x}{kd}}+\frac{T_{i,j}-T_{i,j-1}}{\frac{\Delta y_1}{k\Delta x/2}}+\frac{T_{i,j}-T_{i,j+1}}{\frac{\Delta y_2}{k\Delta x/2}}=P_{total} \quad (14)$$

where $d=(\Delta y_1+\Delta y_2)/2$.

In fluidic cooling, since the micro-channel cross-sectional dimension is much smaller than its length, the flow velocity along the longitudinal direction is much larger than in the lateral direction. It can therefore be assumed that the fluid only flows in the longitudinal direction and flow velocity therefore is constant. The average flow velocity 'v' along y direction has been used for simulating the fluid flow. As a result, equation (2b) can be written as:

$$\sigma c_p v \frac{\partial T(x,y,z)}{\partial y} = \nabla \cdot (k_f \nabla T(x,y,z)) \quad (15)$$

By integrating equation (15) over the dashed cell in FIG. 6 and applying the divergence theorem, equation (15) becomes $$\int_{S1+S2} \sigma c_p v T \hat{y} \cdot \hat{n} dl = \int_{dashed\ line} k_f \nabla T \cdot \hat{n} dl \quad (16)$$

where, S1 and S2 are the upper and bottom boundaries of the dashed cell, as shown in FIG. 6.

For the right hand side of equation (16), the same formulation can be used. For the left hand side, since the central finite difference scheme can generate instability in certain cases, the backward difference approximation is used. The finite volume scheme for solving the heat equation for fluid flow can be expressed as:

$$\frac{T_{i,j}-T_{i-1,j}}{\frac{\Delta x_1}{kd}}+\frac{T_{i,j}-T_{i+1,j}}{\frac{\Delta x_2}{kd}}+\frac{T_{i,j}-T_{i,j-1}}{\frac{\Delta y_1}{kw}}+\frac{T_{i,j}-T_{i,j+1}}{\frac{\Delta y_2}{kw}}= \quad (17)$$

$$\sigma c_p v(T_{i,j}-T_{i,j-1})$$

where $w=(\Delta x_1+\Delta x_2)/2$, $d=(\Delta y_1+\Delta y_2)/2$.

Since the average flow velocity along the longitudinal direction is used in the model, the heat transfer coefficient h needs to be applied at the boundary of the micro-channel to model the heat transfer between the solid medium and the fluid flow. The effect of this boundary condition is important, since eliminating it can cause incorrect chip temperatures. For fluid flow in micro-channels of IC chip, the Reynolds number is usually less than 2300 and the flow is laminar. For fully developed laminar flow inside rectangular micro-channels with constant heat flux, the Nusselt number can be expressed as:

$$Nu = 8.235\left(1-\frac{2.0421}{\alpha}+\frac{3.0853}{\alpha^2}-\frac{2.4765}{\alpha^3}+\frac{1.0578}{\alpha^4}-\frac{1.0861}{\alpha^5}\right) \quad (18)$$

where, $\alpha$ is the aspect ratio of the rectangular micro-channel.

The average heat transfer coefficient can be obtained analytically from the Nusselt number and expressed as:

$$h=Nu \cdot k/D_h \quad (19)$$

where, $D_h$ is the hydraulic diameter of the micro-channel. The same formulation for air convection boundary can be used to model the water convection boundary between the solid medium and water flow.

Based on the above finite volume formulations for voltage distribution equation, heat equations for solid medium and fluid flow with non-uniform rectangular grid, a new steady-state electrical-thermal co-simulation solver (referred to herein as "PowerET") has been developed. This solver has been used to simulate voltage distribution and thermal distribution with Joule heating, air convection, and fluid cooling effects.

In one experimental embodiment, the length of the micro-channel is 20 mm and its cross-sectional dimension is 0.12 mm×0.24 mm. The bulk silicon thermal conductivity is 150 W/(m·K). The cover thickness is 0.05 mm and its thermal conductivity is set to at 0.2 W/(m·K). The heat flux density of 400,000 W/m² is applied at the bottom of the silicon substrate. The input water temperature is set to be 20° C. To test the convergence of the micro-fluidic simulation, the cross-section of the micro-channel is meshed with 2×2, 4×4, 8×8, 16×16 and 32×32 cells (mesh level-1 to mesh level-5), respectively.

With a flow rate of 14.4 mg/s (0.864 ml/min) and using 4×4 meshed cells (mesh level-2) at the cross-section of the micro-channel, the average micro-channel outlet temperature and base temperature are 46.070° C. and 41.93° C., respectively. Compared to the final converged outlet temperature and base temperature of 46.074° C. and 42.17° C., the errors for the average micro-channel outlet temperature and base temperature are both less than 1%. Therefore, using 4×4 meshed cells for the micro-channel cross-section is adequate to obtain accurate results for this example.

In order to verify the model for micro-fluidic cooling against measurement results, the test vehicle with micro-fluidic cooling has been simulated. The structure used is shown in FIGS. 5A and 5B. The chip size was 1 cm×1 cm and the power consumption is 45 W. A total number of 51 micro-channels were distributed uniformly on the chip. The cross-sectional dimension of each micro-channel was 0.1 mm×0.2 mm. A Pyrex glass cover plate is placed on top of the micro-channels. Natural air convection with convection coefficient of 5 W/(m²K) was applied to both the top and bottom surfaces of the package. The thermal conductivity of silicon chip was set to be 110 W/(m·K). The input water temperature at the inlets of micro-channels is set to be 22° C. and water heat capacity $c_p$ is set to be 4180 J/(K$_g$·K). The detailed material thickness and thermal conductivity are listed as follows:

|  | Thickness (mm) | Thermal Conductivity (W/mK) |
| --- | --- | --- |
| Substrate | 0.35 | 0.8 |
| Copper | 0.036 | 400 |
| Chip | 0.3 | 110 |
| Underfill | 0.2 | 4.3 |
| C4 | 0.2 | 60 |
| Micro-channel | 0.2 | 0.6 |
| Pyrex glass | 0.1 | 1.1 |
| Channel pitch | 0.094 |  |

Figure 7:
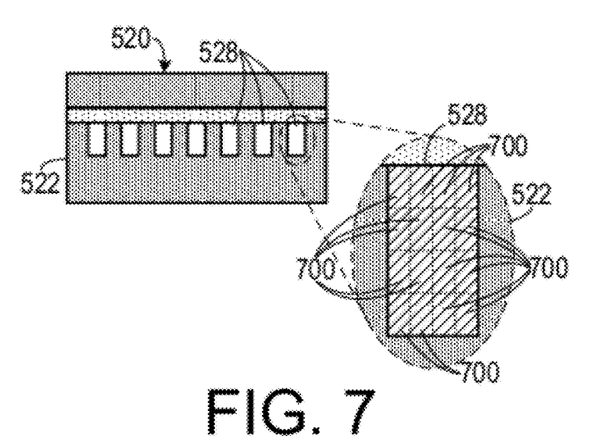
FIG. 7 is a cross-sectional view of a circuit with microfluidic channels and a detail showing the meshing thereof.

A 3D non-uniform mesh was used to approximate the chip, TSVs, underfill, substrate as well as micro-channels. For each micro-channel, the cross-section was also meshed using 4×4 cells, as shown in FIG. 7, in which each micro channel 528 included four rows and four columns, resulting in a mesh of 16 cells 700. This test vehicle was simulated with different water flow rates using the PowerET solver. The comparisons of simulated and measured average outlet temperature of the micro-channels and average chip temperature are plotted and with water flow rates of 65 and 104 ml/min, the differences between the simulated average outlet temperature and actual measurements were 0.1° C. and 0.28° C., respectively. The relative error was less than 4.5% for the outlet temperature. For average chip temperature, with water flow rates of 65 and 104 ml/min, the temperature differences between the simulation and measurements were 2.6 and 1.7° C., respectively. Their corresponding errors were 13.7% and 13.9%, respectively. The relative larger error for the average chip temperature may due to the average heat transfer coefficient h employed in the fluidic cooling model.

Figure 8A:
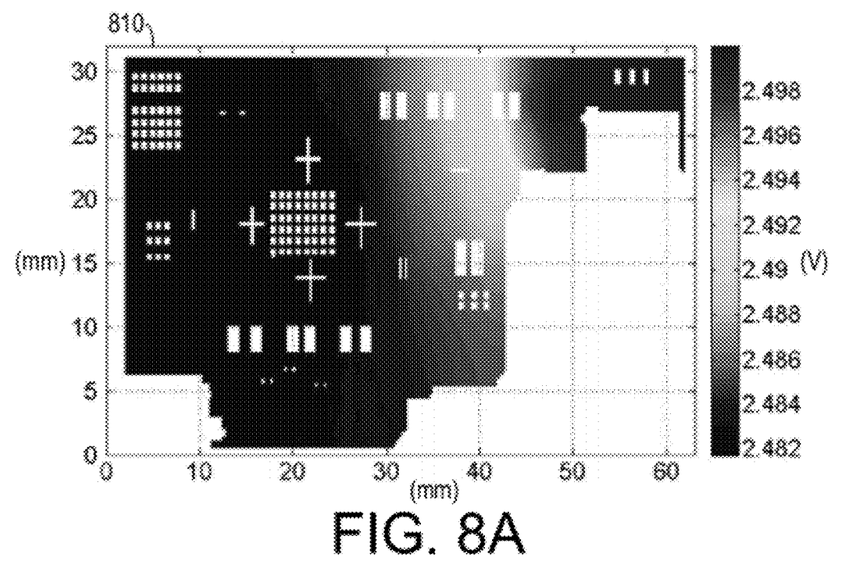
FIG. 8A is a graphic representation of a voltage drop result of a circuit simulation.
Figure 8B:
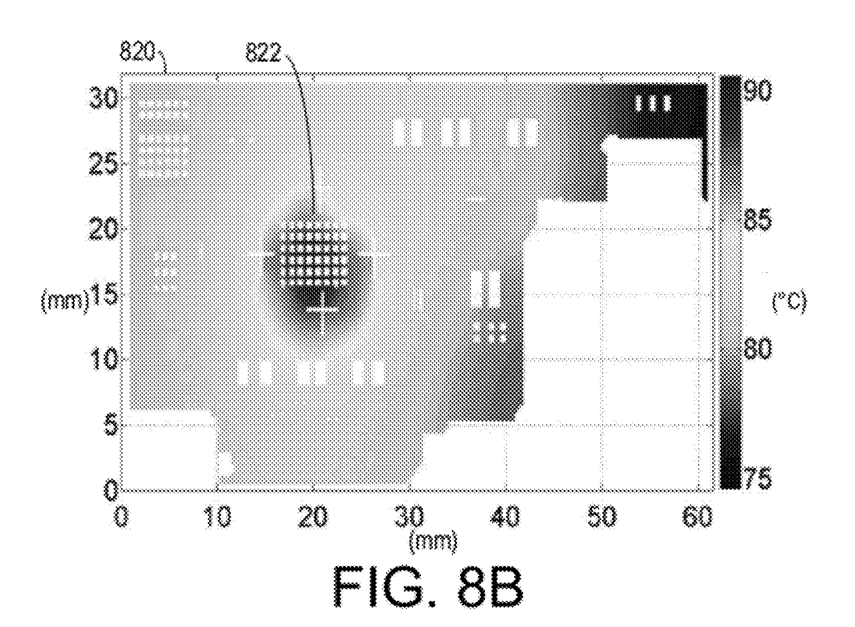
FIG. 8B is a graphic representation of a temperature result of a circuit simulation.

In practical package or board designs, the power delivery network usually has irregular shape with many voids or apertures. In order to simulate practical designs, a new interface, which can import board and package design files from the Cadence SPB software into the PowerET solver. A Cadence board design example dimension was 60 mm×31 mm and the chip was 9 mm×9 mm. The chip total power consumption was 50 W. The thermal conductivity of thermal interface material (TIM) was 2 W/(mK). The heat sink was modelled as an ideal heat sink with constant room temperature of 25° C. This example was simulated with convection coefficient of 5 W/(m$^2$K) on both sides of the board. The simulated voltage and temperature of the chip with electrical-thermal iterations shows that the final chip temperature was increased to 92.1° C. because of the power density from the chip and Joule heating effect from PDN. Compared to an initial voltage drop of 15 mV, the final voltage drop is increased to 18.2 mV. Therefore, the thermal effect on voltage drop is 21.3%. The final voltage distribution 810 is shown in FIG. 8A and the final and temperature distribution 820 is shown in FIG. 8B. In the example shown the temperature distribution shows a hot spot 822 in an area where an integrated circuit is mounted.

In the finite volume modelling of voltage distribution equation and heat equations with fluidic cooling and air convection are presented, electrical-thermal co-simulations of PDN with Joule heating, air convection and micro-fluidic cooling are carried out. Good agreement between the simulated results, measurement and analytical results validate the correctness and accuracy of the electrical-thermal co-simulation method. Moreover, the simulation shows that micro-fluidic cooling method can remove heat more efficiently than traditional heat sink for high power density 3D sub-systems. Therefore, the thermal effect on the voltage drop in PDN is reduced using micro-fluidic cooling technology.

This system allows users to perform both local modeling and global modeling of electronic circuits. For example, the following may be modeled: chips, under fill, solder, through silicon vias (even a single TSV) and any component that has operational parameters affected by temperature.

The output from the simulator could take one of many forms. For example, it could be a temperature plot, a voltage plot, a plot of an equivalent resistance, etc. It could also take the form of tables or lists that show operating parameters (e.g., temperature, IR drop, voltage drop, etc.) of individual components or volumes within a circuit. In addition post processing can also include calculations of current density along with electrical current plots, temperature gradients and voltage gradients.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A method, operable on a digital computer coupled to a user interface, for simulating electrical characteristics and temperature characteristics in an electronic circuit, comprising the steps of:

(a) executing on the digital computer a routine for generating a three-dimensional mesh, wherein the three-dimensional mesh comprises a selected one of: a rectangular prismatic mesh and a tetrahedral mesh, that includes a plurality of cells and a plurality of nodes, wherein each cell represents a heat conducting volume within the circuit and wherein each node represents an electrically conducting point within the circuit;

(b) initializing each of: a previous iteration temperature variable associated with each cell; a current iteration temperature variable associated with each cell; a previous iteration resistance variable associated with each node; and a current iteration resistance variable associated with each node;

(c) until the previous iteration temperature variable associated with each cell is within a first predetermined tolerance of the current iteration temperature variable associated with each cell and the previous iteration resistance variable associated with each node is with a second predetermined tolerance of the current iteration resistance variable associated with each node, performing the following steps:

(i) calculating for each cell an average temperature of the cell based on: heat generated in the cell as a result of a pre-calculated current flowing through a previous resistance having a value corresponding to the previous iteration resistance variable associated with a node within the cell and heat transferred out of the cell and storing the average temperature in the current iteration resistance variable associated with the cell;

(ii) calculating for each node a current resistance associated with the node based on the previous iteration temperature variable for a cell in which the node resides and storing the current resistance in the current iteration resistance variable associated with the node;

(iii) comparing the previous iteration temperature variable associated with each cell to the current iteration temperature variable associated with each cell and comparing the previous iteration resistance variable associated with each node to the current iteration resistance variable associated with each node; and (iv) after the comparing step, storing the average temperature in the previous iteration temperature variable and storing the current iteration resistance in the previous iteration resistance variable; and (d) once the previous iteration temperature variable associated with each cell is within the first predetermined tolerance of the current iteration temperature variable associated with each cell and when the previous iteration resistance variable associated with each node is within the second predetermined tolerance of the current iteration resistance variable associated with each node, then generating an output that indicates an average temperature associated each cell.

2. The method of claim 1, further comprising the step of calculating a voltage at each node.

3. The method of claim 1, wherein the step of calculating for each cell an average temperature is further comprises determining heat transferred from the cell as a result of a fluid flowing near the cell.

4. The method of claim 1, wherein the three-dimensional mesh comprises a regular mesh.

5. The method of claim 1, wherein the three-dimensional mesh comprises an irregular mesh.

6. The method of claim 1, further comprising the step of generating a graphical representation of at least one of the electrical characteristics and the temperature characteristics in the electronic circuit.

7. A method, operable on a digital computer coupled to a user interface, for simulating temperature and electrical characteristics within a circuit, comprising:

executing on the digital computer a routine for generating a three-dimensional mesh, wherein the three-dimensional mesh comprises a selected one of: a rectangular prismatic mesh and a tetrahedral mesh, that includes a plurality of cells and a plurality of nodes, wherein each cell represents a heat conducting volume within the circuit and wherein each node represents an electrically conducting point within the circuit;

initializing each of a previous iteration temperature variable associated with each cell, a current iteration temperature variable associated with each cell, a previous iteration resistance variable associated with each node, and a current iteration resistance variable associated with each node;

until the previous iteration temperature variable associated with each cell is within a first predetermined tolerance of the current iteration temperature variable associated with each cell and the previous iteration resistance variable associated with each node is with a second predetermined tolerance of the current iteration resistance variable associated with each node, performing the following steps of:

executing on the digital computer a routine for repeatedly calculating a temperature of at least one volume within the circuit as a function of a resistance within the at least one volume and repeatedly calculating the resistance as a function of the temperature until the temperature is within a predetermined tolerance of a previous temperature result until the resistance is within a predetermined tolerance of a previous resistance result, wherein the step of calculating a temperature includes the step of calculating an amount of heat removed from the at least one volume as a result of a fluid flowing near the at least one volume;

calculating a current iteration average temperature for each cell and a current iteration resistance associated with each node;

comparing the current iteration average temperature for each cell to a previous iteration average temperature for each cell and comparing the current iteration resistance associated with each node to a previous iteration resistance associated with each node;

storing the average temperature in the previous iteration temperature variable and storing the current iteration resistance in the previous iteration resistance variable;

once the temperature is within the predetermined tolerance of the previous temperature result and the resistance is within the predetermined tolerance of the previous resistance, then executing on the digital computer a routine for generating an output indicative of the temperature.

8. The method of claim 7, further comprising the step of executing on the digital computer a routine for generating a three-dimensional mesh representative of the circuit, the three dimensional mesh including a plurality of volumes.

9. The method of claim 7, further comprising the step of, once the temperature is within a predetermined tolerance of the previous temperature result and the resistance is within a predetermined tolerance of the previous resistance, then executing on the digital computer a routine for generating an output indicative of a voltage within the volume.

10. The method of claim 7, further comprising the steps of:
(a) executing on the digital computer a routine for calculating a voltage within the volume as a function of the resistance; and
(b) executing on the digital computer a routine for generating an output indicative of the voltage.

11. The method of claim 7, wherein the step of generating an output indicative of the temperature comprises the step of generating a graphical display showing temperature at various locations in the circuit.

12. A circuit simulation device, comprising:
(a) a digital computer including a non-volatile memory;
(b) a mesh generator routine, stored on the non-volatile memory and operable on the digital computer, that is configured to generate a three-dimensional mesh that includes a plurality of cells and a plurality of nodes, wherein each cell represents a heat conducting volume within a circuit and wherein each node represents an electrically conducting point within the circuit;
(c) an initializer routine, stored on the non-volatile memory and operable on the digital computer, that is configured to initialize each of: a previous iteration temperature variable associated with each cell; a current iteration temperature variable associated with each cell; a previous iteration resistance variable associated with each node; and a current iteration resistance variable associated with each node;
(d) a simulator, stored on the non-volatile memory and operable on the digital computer, that is configured to repeatedly perform a simulation until a current iteration average temperature for each cell is within a first predetermined tolerance of a previous iteration average temperature and until a current iteration resistance for each node is within a second predetermined tolerance of a previous iteration average temperature for each cell, wherein the simulator comprises a routine stored on the non-volatile memory that is configured to run on a digital computer and to calculate a numerical simulation of a first partial differential equation that determines cell temperature as a function of node resistance and a second partial differential equation that determines node resistance as a function of cell temperature, the simulator thereby being configured to:
(i) determine the current iteration average temperature for each cell and the current iteration resistance associated with each node;
(ii) compare the current iteration average temperature for each cell to the previous iteration average temperature for each cell and compare the current iteration resistance associated with each node to the previous iteration resistance associated with each node; and
(iii) save the current iteration average temperature for each cell as the previous iteration average temperature for each cell and save the current iteration resistance associated with each node as the previous iteration resistance associated with each node; and (e) an interface that is configured to output an indication, received from the digital computer, of the current iteration average temperature of each cell.

13. The circuit simulator of claim 12, wherein the mesh generator includes a routine stored on the non-volatile memory that is configured to run on a digital computer.

14. The circuit simulator of claim 12, wherein the interface comprises a routine, stored on the non-volatile memory and operable on the digital computer, that is configured to generate a graphical representation of the current iteration average temperature of each cell.

15. The circuit simulator of claim 12, wherein the simulator if further configured to determine an amount of heat removed from each cell as a result of a fluid flowing near the cell.

16. The circuit simulator of claim 12, wherein the simulator is configured to simulate fluid flowing through micro-channels flowing through the circuit.

17. The circuit simulator of claim 12, wherein the simulator is further configured to determine a voltage at each node.

\* \* \* \* \*